United States Patent [19]

Winzeler et al.

[11] 4,446,758
[45] May 8, 1984

[54] PLANETARY TRANSMISSION

[75] Inventors: James E. Winzeler, East Peoria; Willis E. Windish, Pekin, both of Ill.

[73] Assignee: Caterpillar Tractor Co., Peoria, Ill.

[21] Appl. No.: 288,951

[22] PCT Filed: Jul. 7, 1981

[86] PCT No.: PCT/US81/00917

§ 371 Date: Jul. 7, 1981

§ 102(e) Date: Jul. 7, 1981

[87] PCT Pub. No.: WO83/00200

PCT Pub. Date: Jan. 20, 1983

[51] Int. Cl.³ .................. F16H 3/44; F16H 57/10; F16H 37/00

[52] U.S. Cl. .................. 74/781 R; 74/758; 74/760; 74/766; 74/15.63

[58] Field of Search .................. 74/781 R, 764, 760, 74/759, 758, 766, 767, 772, 11, 15.6, 15.63, 15.66, 15.84, 15.8; 192/86

[56] References Cited

U.S. PATENT DOCUMENTS

| 2,221,393 | 11/1940 | Carnegie | 74/262 |
|---|---|---|---|
| 2,516,208 | 7/1950 | Hasbany | 74/781 R |
| 2,726,748 | 12/1955 | Questgaard et al. | 192/86 |
| 2,775,330 | 12/1956 | Schjolin et al. | 192/86 |
| 2,933,944 | 4/1960 | Carnagua | 74/781 R |
| 2,978,928 | 4/1961 | Tuck et al. | 74/645 |
| 3,031,901 | 5/1962 | Simpson | 74/759 |
| 3,181,393 | 5/1965 | Jandasek | 74/781 R |
| 3,319,491 | 5/1967 | Simpson | 74/15.66 |
| 3,352,166 | 11/1967 | Marquart et al. | 74/15.84 |
| 3,410,157 | 11/1968 | Livezey | 74/758 |
| 3,796,817 | 12/1976 | Winzeler | 74/764 |
| 3,863,746 | 2/1975 | Schulz | 192/86 |
| 4,019,406 | 4/1977 | Herr | 74/766 |
| 4,036,081 | 7/1977 | Onuma et al. | 74/781 R |
| 4,090,415 | 5/1978 | Gorrell et al. | 74/769 |
| 4,189,960 | 2/1980 | Holdeman | 74/781 R |
| 4,205,563 | 6/1980 | Gorrell | 74/730 |
| 4,214,489 | 7/1980 | Ahlen et al. | 74/761 |
| 4,275,608 | 6/1981 | Brancolini | 74/15.63 |

FOREIGN PATENT DOCUMENTS

| 677960 | 6/1939 | Fed. Rep. of Germany | 192/86 |
|---|---|---|---|
| 2439604 | 3/1975 | Fed. Rep. of Germany | 74/759 |
| 995233 | 6/1965 | United Kingdom | 74/760 |

Primary Examiner—Allan D. Herrmann
Assistant Examiner—D. Wright
Attorney, Agent, or Firm—Charles E. Lanchantin, Jr.

[57] ABSTRACT

A planetary transmission (10) is disclosed including a front section (42/160) having a rotating housing (46/176) and a planetary gear set (20/162) with a ring gear (66/168), a sun gear (68/170) and a planet carrier (70/172). Advantageously, the rotating housing (46/176) serves as the input and one of the planet carrier (70) and the ring gear (168) serves as the output. The sun gear (68/170) is continually held stationary, a first clutch assembly (30/164) selectively connects the rotating housing (46/176) to the ring gear (66/168), and a second clutch assembly (32/166) selectively connects the rotating housing (46/176) to the planet carrier (70/172). The front section (42/160) of the transmission (10) is operatively connected to a rear section (44) for multi-speed use particularly adaptable to a truck or earthmoving vehicle.

8 Claims, 4 Drawing Figures

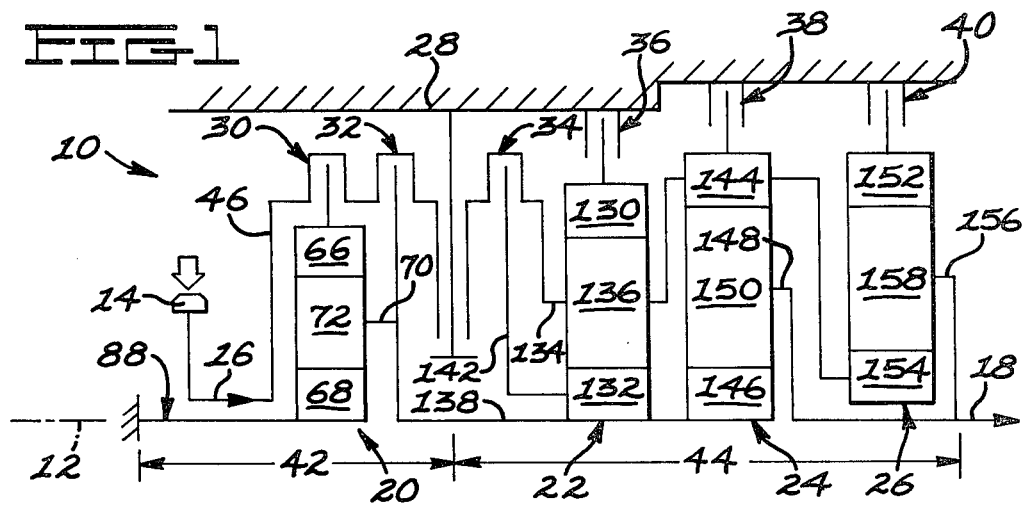
FIG-1
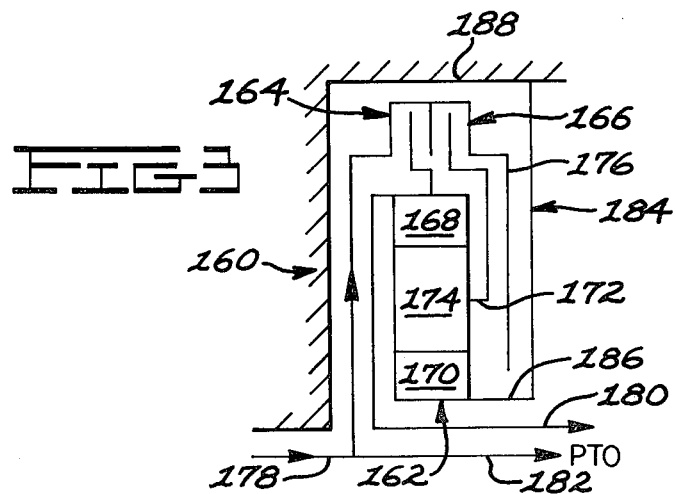
FIG-3
FIG-2
| GEAR | CLUTCHES & BRAKES ENGAGED | | | | | | TOTAL REDUCTION | STEP RATIO |
|---|---|---|---|---|---|---|---|---|
| | 30 | 32 | 34 | 36 | 38 | 40 | | |
| 1 | ● | | | | ● | | 4.52 | 1.35 |
| 2 | | ● | | | ● | | 3.35 | 1.36 |
| 3 | ● | | | ● | | | 2.47 | 1.35 |
| 4 | | ● | | ● | | | 1.83 | 1.36 |
| 5 | ● | | ● | | | | 1.35 | 1.35 |
| 6 | | ● | ● | | | | 1.00 | |
| R | ● | | | | | ● | -4.99 | |
| N | | | ● | | | | — | |

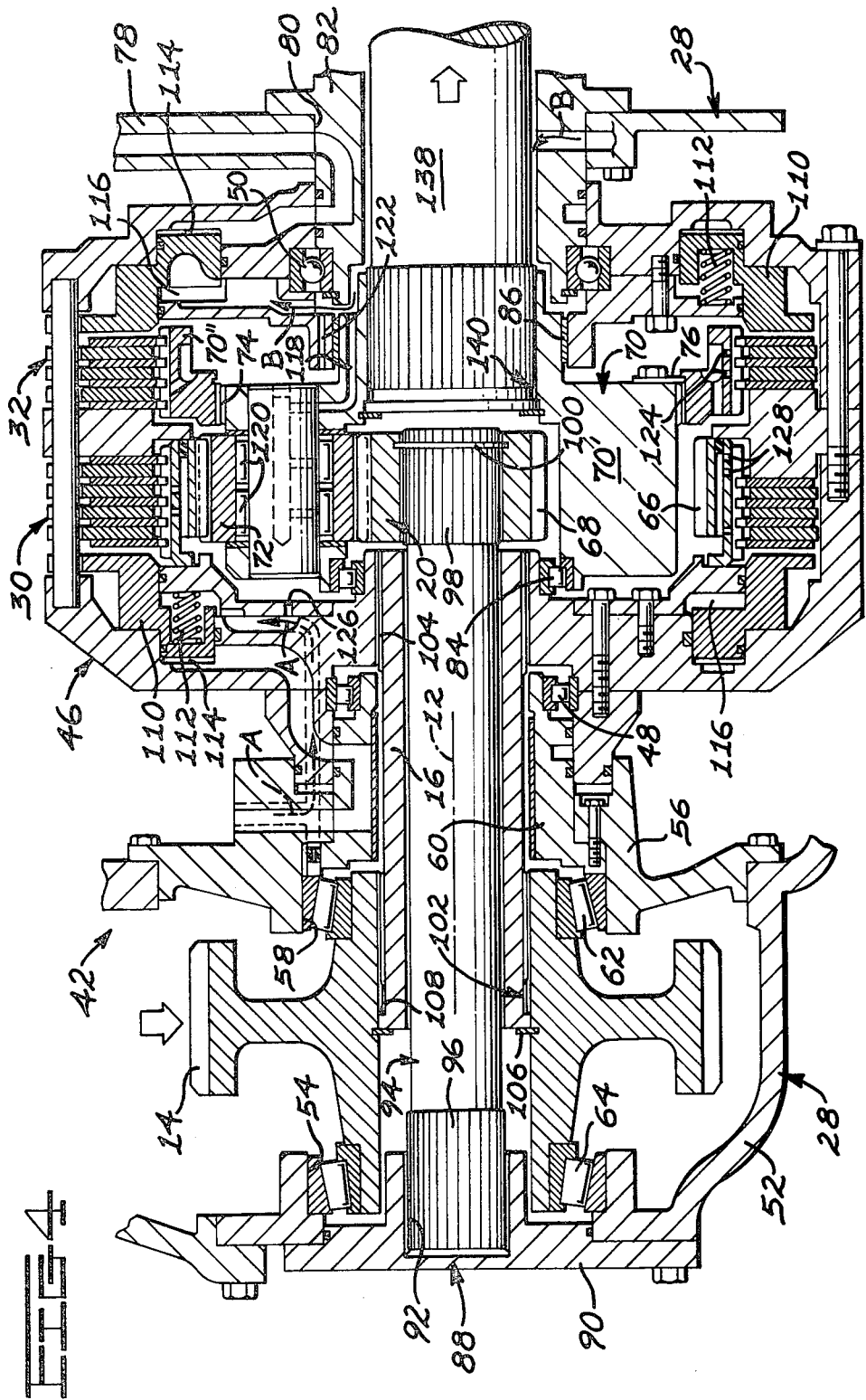

PLANETARY TRANSMISSION

DESCRIPTION

1. Technical Field

This invention relates generally to a planetary transmission, and more particularly to a multi-speed planetary transmission for a vehicle.

2. Background Art

Power shift transmissions are known in the earthmoving and trucking vehicle industries which offer a large number of gear ratios by utilizing a plurality of serially interconnected planetary gear sets and a plurality of clutches and brakes for effecting the individual gear steps. Some of these transmissions have a two speed front section followed by a multi-speed range section for providing four or more forward speeds and at least one speed in reverse. Exemplifying the art in this area are: U.S. Pat. No. 2,221,393 issued Nov. 12, 1940 to W. L. Carnegie; U.S. Pat. No. 2,978,928 issued Apr. 11, 1961 to R. M. Tuck, et al; U.S. Pat. No. 3,410,157 issued Nov. 12, 1968 to W. G. Livezey; U.S. Pat. No. 3,996,817 issued Dec. 14, 1976 to J. E. Winzeler; U.S. Pat. No. 4,090,415 issued May 23, 1978 to J. M. Gorrell, et al; and U.S. Pat. No. 4,205,563 issued June 3, 1980 to J. M. Gorrell.

One of the disadvantages of those prior transmissions having a dual speed front section or front planetary splitter unit is that their constructions do not favor their use as energy dissipators during power shifting of the gears. For example, many front sections have utilized one interleaved disc type brake assembly for selectively holding the sun gear of a single planetary set stationary and providing a speed other than unity, and one interleaved disc type clutch assembly for selectively coupling the sun gear and the planet carrier together and affording a direct drive speed. But such construction is undesirable because the sun gear operates at relatively high speed, low torque conditions so that the energy levels that must be absorbed by the brake and/or clutch become excessive and require an uneconomical construction. Furthermore, when certain ones of the clutch and/or brakes in the associated range section are engaged, such as in neutral, then the relative speeds of the planet gear elements or sun gear in the front section become so high that their service lives are appreciably reduced.

Still another problem with dual speed front splitter units is that the rotating output member thereof to the rear range unit could have a relatively high mass and/or moment of inertia. This could be vexatious during the transient conditions of a gear shift in that such mass can cause a greater than desired variation in the energy absorption requirements between certain shifts. In other words, some shifts can be smooth and others harsh so that costly and discriminating control systems are required to make each gear shift more uniform to the vehicle operator.

Another factor is that the construction of a stationary disc type brake assembly does not favor the radial distribution of lubricating fluid therethrough for cooling and energy dissipation purposes to the same degree as a rotating disc type clutch assembly.

Accordingly, what is desired is a simple two-speed front section of a power shift transmission having a disc-type coupling construction which is associated with a relatively high torque member and which will aid in the distribution of cooling fluid therethrough. In this way the cost of construction can be minimized, and yet the compact couplings that are utilized can still absorb the appreciable amounts of energy resulting from a gear shift. Along with this is the need to effectively combine the front section with a rear range section to give a plurality of properly graduated gear speeds, and the need to provide relatively low relative speeds between the interleaved disc and plate members of the various clutches and brakes in the transmission.

The present invention is directed to overcoming one or more of the problems as set forth above.

DISCLOSURE OF THE INVENTION

In one aspect of the invention a planetary transmission includes a front section having a rotating housing and a planetary gear set having a ring gear, a sun gear, and a planet carrier, with the rotating housing serving as the input and one of the planet carrier and the ring gear serving as the output. Advantageously, means are provided for holding the sun gear stationary, first clutch means are provided for selectively connecting the ring gear to the rotating housing, and second clutch means are provided for selectively connecting the planet carrier to the rotating housing.

In another aspect of the invention a planetary transmission includes a rotating housing, a planetary gear set having a sun gear, a planet carrier and a ring gear, and means for continually holding the sun gear stationary. Also included are first clutch means for selectively connecting the ring gear to the rotating housing and having a hydraulically engaged and spring disengaged piston, and second clutch means for selectively connecting the planet carrier to the rotating housing and having a hydraulically engaged and spring disengaged piston, with the rotating housing and the pistons being conjointly rotatable and desirably serving as a significant driven input mass.

In another aspect of the invention the aforementioned front section is operatively connected to a rear section having a plurality of planetary sets and a plurality of coupling means to selectively provide a multiplicity of speeds. Such construction is particularly adaptable to a truck or wheel tractor.

Since the sun gear element of the planetary gear set of the front section of the transmission is continually grounded or held stationary, the relative speeds of the elements and the energy dissipation capabilities of the two rotating clutches can be more effectively determined. Whenever the associated engine is operating, the rotating housing will be rotating to effectively aid in the distribution of lubricating and cooling fluid through the clutches. Moreover, the inertia mass of the rotating housing is connected to the input which tends to smooth the transient energy absorbing shocks associated with gear shifts in much the same way as a heavy engine flywheel does.

BRIEF DESCRIPTION OF THE DRAWINGS

FIG. 1 is a diagrammatic, side elevational view of one embodiment of the planetary transmission of the present invention and showing the planetary elements on only one side of the rotational axis for simplicity.

FIG. 2 is a chart showing the various clutches and brakes which must be engaged to obtain the six forward and one reverse speeds of the transmission illustrated in FIG. 1, along with the total speed ratio reduction for each speed and the step ratios between each speed.

FIG. 3 is a diagrammatic, side elevational view of a second embodiment of the planetary transmission of the present invention which is comparable to the front section of the transmission illustrated in FIG. 1.

FIG. 4 is a diagrammatic, side elevational sectionalized view of the front section of the planetary transmission shown in FIG. 1, and illustrating portions thereof in greater detail.

BEST MODE FOR CARRYING OUT THE INVENTION

Referring initially to FIG. 1, a vehicle planetary transmission 10 is schematically illustrated on one side of a rotational axis 12. The transmission includes an engine-driven input gear 14 releasably connected to a hollow input shaft 16, and an output shaft 18 connected to a conventional mechanism, not shown, for powerably rotating the ground-engaging members of the vehicle. In the embodiment illustrated, four interconnected planetary gear sets or epicyclic gear trains 20,22,24 and 26 are rotatably supported concentrically along the axis within a surrounding and generally tubular transmission housing 28. Three rotating clutch means or disc-type clutch assemblies 30,32 and 34 and three brake means or disc-type brake assemblies 36,38 and 40 are serially arranged along the length of the transmission for cooperating with and selectively coupling certain elements of the planetary gear sets and providing six forward speeds and at least one reverse speed as is generally indicated by the speed chart of FIG. 2. This particular transmission is, for example, particularly well suited for a large material-carrying truck.

The planetary transmission 10 has a front section or splitter speed unit 42 of a particularly desirable construction, and a rear section or range unit 44 operatively associated therewith. The front section includes the first planetary gear set 20 and the first and second clutch means 30,32, and basically provides an underdrive mode of operation or a direct drive mode of operation. The rear section includes the remaining planetary gear sets 22,24 and 26, the third clutch means 34, and the three brake means 36,38 and 40 and affords a plurality of speed reduction ratios as well as at least one reverse speed.

As is best illustrated in FIG. 4, the front section 42 includes a rotating housing 46 which is supported by a front roller bearing assembly 48 and a rear ball bearing assembly 50 on the transmission housing 28. More particularly, the transmission housing has a front case 52 defining a stepped front opening 54 therethrough concentric with the central axis 12. A flanged supporting wall 56 is releasably secured to the front case and also defines a stepped opening 58 on the axis which receives a flanged fluid distribution and support sleeve 60. The front roller bearing assembly 48 is mounted on the rear end of the support sleeve and a tapered roller bearing assembly 62 is seated in the stepped opening 58 of the wall and against the front end of the support sleeve. Another tapered roller bearing assembly 64 is seated in the stepped front opening 54 of the case, and the two tapered roller bearing assemblies serve to rotatably support the input gear 14.

The first planetary gear set 20 includes first ring gear, sun gear and planet carrier elements 66,68 and 70 of the type wherein a plurality of similar planet gear elements 72 are rotatably mounted on the carrier element and are in intermeshing engagement with the teeth on the ring and sun gear elements.

As can be noted from viewing FIG. 4, the planet carrier element 70 is of two-piece construction. Specifically, the carrier element is made up of a central body part 70' and a generally encircling externally toothed ring 70" releasably connected thereto by a spline 74. A plurality of retaining lock plates 76 are releasably secured to the body part and are interlockingly engaged with the toothed ring to axially position it thereon. This construction permits more convenient machining of elements 70' and 77" while also contributing to compactness and the accommodation thereof to alignment with the associated elements of the front section.

An intermediate wall 78 defining an opening 80 on the axis 12, and being located at the right side when viewing FIG. 4, is connected to the transmission housing 28. A flanged fluid distribution and support sleeve 82 is releasably secured to the intermediate wall and serves as a mounting for the rear ball bearing assembly 50. The ball bearing assembly 50 not only rotatably supports the rear portion of the rotating housing 46, but also axially positions it and absorbs the axial thrust thereof. The front roller bearing assembly 48 supports the front portion of the rotating housing while accommodating any changes in the length of the rotating housing due to tolerance stack up and heat growth. In turn, the first planet carrier body part 70' is rotatably supported within the rotating housing by a front roller bearing assembly 84 and a rear sleeve bearing 86.

Advantageously, holding means 88 are provided for continually holding the sun gear element 68 stationary as a reaction member. In the instant embodiment such holding means includes an end plate 90 which is releasably secured to the front case 52 and which closes the stepped opening 54. The end plate defines an inwardly facing splined bore 92 for receiving an elongate shaft 94. Specifically, the shaft has forward splines 96 interlockingly received in the splined bore, and rearward splines 98 upon which the first sun gear element 68 is nonrotatably mounted. A lock ring 100 secures the sun gear element axially in place on the shaft. Thus, the sun gear element is supported with a preselected degree of floatability or self-alignment capability within the peripherally equally spaced planet gear elements 72, only one of which is illustrated in the drawing.

As is illustrated in FIG. 4, the shaft 94 extends along the axis and is encircled by the tubular connecting input shaft 16. The input shaft is connected to the hollow input gear 14 by a front spline and interlocking coupling 102, and is connected to the rotating housing 46 by a rear spline coupling 104. Accordingly, the input gear, the input shaft, and the rotating housing rotate as a unit, with the input shaft being blocked from leftward movement by a retaining ring 106 and being blocked from rightward movement when viewing the drawing by an abutting flange 108 thereon and forming portions of the interlocking coupling 102.

First clutch means 30, when engaged, directly couples the rotating housing 46 to the first ring gear element 66 to provide an underdrive mode of operation. Alternatively, second clutch means 32 directly couples the rotating housing to the first planet carrier element 70 to give a direct drive. Each clutch means includes a hydraulically engaged annular actuating piston 110 which is retracted by a plurality of compression springs 112. Pressurized fluid can be selectively delivered to the respective actuating chamber 114 defined between the rotating housing and piston on one side thereof, and counterbalancing fluid under centrifugal pressure and a preselected static pressure head is supplied to a balancing chamber 116 on the opposite side thereof to promote more rapid disengagement of the piston upon release of pressure to the actuating chamber and to promote lubrication of the first and second clutch means. Lubricating fluid is forcibly directed to the front or leftwardly located balancing chamber 116 along the path designated by the flow arrows identified by the letter A at a preselected relatively low pressure, for example 175 KPa (25 psi). It is forcibly directed to the rear balancing chamber along the path illustrated by the flow arrows identified by the letter B at the same relatively low pressure. In this regard note that a flow-limiting passage 118 in the planet carrier body part 70' directs a preselected portion of the flow from path B past partially sealing sleeve bearing 86 and to the planet gear bearings 120. Another flow-limiting or orificed passage 122 in the rotating housing 46 controllably diverts fluid that is required to fill the balancing chamber 116 from the path B and past the sleeve bearing 86 to the second clutch means 32 for cooling purposes via a plurality of generally radially oriented holes or passages 124 in the ring 70". Similarly, flow-limiting or orificed passage 126 in the rotating housing controllably permits lubricating and cooling fluid to pass from the path A and left balancing chamber 116 to the first clutch means 30 via a plurality of generally radially oriented holes or passages 128 in the ring gear 66.

The third clutch means 34 illustrated only schematically in FIG. 1 is of similar construction to the clutch means 30 and 32 shown in detail in FIG. 4. The brake means 36,38 and 40 are preferably hydraulically engaged and spring disengaged also, but do not need the balancing chamber type construction set forth with respect to clutch means 30 and 32. While clutch means 34, and brake means 36,38 and 40 are not illustrated in detail, they are preferably of the disc type such as having a plurality of interleaved discs and plates which are axially slideable toward engagement by the respective actuating pistons as is known to those skilled in the power shift transmission art.

Referring now to FIG. 1 and the construction of the rear section 44 of the transmission 10, the second planetary gear set 22 can be noted to include second ring gear, sun gear and planet carrier elements 130,132 and 134 and a plurality of similar planet gear elements 136. The second sun gear 132 is releasably connected to an intermediate shaft 138 which provides the input to the rear section since it is releasably connected to and rotates with the first planet carrier element 70 by a spline and interlocking coupling 140 as is shown in FIG. 4. The interlocking coupling 140 is similar to interlocking coupling 102 described earlier. The axial disposition of the intermediate shaft 138 axially positions the first planet carrier through the interlocking coupling and the roller bearing assembly 84 is adaptable to tolerate variations in the position thereof.

An annular plate member 142 is connected to and rotates with the second sun gear 132 as is schematically shown in FIG. 1. When the third clutch means 34 is engaged, the second sun gear and the second planet carrier element 134 are coupled directly together. When the first brake means 36 is engaged the second ring gear 130 is held stationary or fixed to the housing 28.

The third planetary gear set 24 includes third ring gear, sun gear and planet carrier elements 144,146 and 148 and a plurality of planet gear elements 150. As can be noted, the third ring gear 144 is connected for joint rotation with the second planet carrier element 134, and is selectively connected to the housing 28 by the second brake means 38. The third sun gear 146 is preferably releasably connected to the intermediate shaft 138 in a manner like the second sun gear 132, for example by the usual spline coupling.

The fourth planetary gear set 26 includes fourth ring gear, sun gear and planet carrier elements 152,154 and 156 and a plurality of planet gear elements 158. The fourth sun gear 154 is connected to the third ring gear element 144 for joint rotation, and the fourth planet carrier element 156 is connected to rotate with the output shaft 18 as is the third planet carrier element 148. When the third brake means 40 is engaged the fourth ring gear element 152 is connected to the housing 28 and held stationary as a reaction member.

SECOND EMBODIMENT

Referring now to FIG. 3, another embodiment front splitter section 160 is shown schematically. It includes a planetary gear set 162, first clutch means 164 and second clutch means 166 serving to respectively provide a direct drive mode and an overdrive mode of operation. The planetary gear set 162 includes ring gear, sun gear and planet carrier elements 168,170 and 172 and a plurality of similar planet gear elements 174 rotatably mounted on the carrier element and being intermeshingly engaged with the teeth on the ring gear and sun gear elements.

The front section 160 has a rotating housing 176 similar to the rotating housing 46 described with respect to FIGS. 1 and 4, and likewise being connected to rotate with an input shaft 178 about the central axis thereof. A hollow or tubular output shaft 180 from the front section can be directed to a rear section similar to, or modified from, the rear section 44 of FIG. 1. And, a power take off (PTO) shaft 182 can be connected to rotate with the input shaft on the axis.

Holding means 184 are provided for continually holding the sun gear element 170 stationary as a reaction member. Such holding means can include a member 186 releasably connected to the sun gear element and extending rearwardly, and being releasably connected to the housing 188.

Engagement of the first clutch means 164 will effectively directly couple the rotating housing 176, the ring gear 168, and the output shaft 180 to provide a direct drive. Engagement of the second clutch means 166 will directly couple the rotating housing to the planet carrier element 172. Since the sun gear element 170 is stationary, the input to the planet carrier element will cause the planet gear elements to walk around the sun gear and to drive the ring gear element 168 and the output shaft at an increased speed to provide an overdrive mode of operation.

INDUSTRIAL APPLICABILITY

The planetary transmission 10 of FIGS. 1, 2 and 4 is of a construction specifically adaptable for use in the power train of a large off-highway earthmoving truck.

In the first forward gear the first clutch means 30 is engaged in the front section 42 to couple the input shaft 16 and the first ring gear 66 for joint rotation and to provide an underdrive mode of operation. That is, the speed reduction between the input shaft 16 and the output first planet carrier 70 is about 1.35 because the planet gears 72 are caused to rotate about the stationary sun gear 68. Simultaneously, the second brake means 38 is engaged in the rear section 44 to hold the ring gear 144 fixed to the encircling housing 28 and to afford a speed reduction with respect to the intermediate shaft 138 of about 3.35. In the rear section the third sun gear 146 serves as the input since it is directly coupled to the intermediate shaft 138, and the planet gears 150 are caused to rotate about the stationary third ring gear 144 and to drive the planet carrier 148 and the output shaft 18 at a total reduction ratio of 4.52 for the transmission 10 as can be noted from reference to the chart of FIG. 2.

A shift to second gear from first gear is accomplished by disengaging the first clutch means 30 and engaging the second clutch means 32. This results in directly connecting the input shaft 16 and rotating housing 46 to the output planet carrier 70. It can be noted from FIG. 2 that the second brake means 38 remains engaged.

Shifting from second to third gear is achieved by returning to the underdrive mode in the front section by disengaging clutch means 32 and reengaging clutch means 30. At the same time the second brake means 38 is disengaged and the first brake means 36 engaged. In the rear section 44 the ring gear 130 is held stationary, and both the sun gears 132 and 146 provide the input thereto via the intermediate shaft 138. Thus, the second and third planetary gear sets 22 and 24 cooperate through load sharing or split power flow paths to give a speed reduction of about 1.83 between the intermediate shaft 138 and the planet carrier 148 and associated output shaft 18.

Turning next to a shift from third to fourth gear, this is accomplished by merely shifting the front section 42 back to the direct drive mode while continuing to hold the first brake means 36 engaged.

In fifth gear the front section is returned to the underdrive condition, but the brake means 36 is disengaged and the third clutch means 34 is engaged in the rear section. Such action in the rear section directly couples the planet carrier 134 to the sun gear 132, and hence the ring gear 130, the intermediate shaft 138, the ring gear 144, the sun gear 146, and thus the planet carrier 148 and the entire fourth planetary gear set 26 for joint rotation as a unit.

Top or sixth gear operation retains the direct drive conditions of fifth gear in the rear section, and places the front section in direct drive also.

Reverse is achieved by engaging the front clutch means 30 for an underdrive mode of operation in the front section, and in the rear section the third brake means 40 is engaged for reverse. With the last ring gear 152 held stationary the third and fourth planetary gear sets 24 and 26 cooperate to provide a negative speed reduction of about 3.7 along multiple power paths wherein the planet carrier torques are subtracted from one another. In other words a portion of the torque flow is recirculated from the fourth sun gear element 154 back to the third ring gear element 144.

Neutral can be achieved by the sole engagement of the third clutch means 34. This results in directly coupling the output shaft 18 to the intermediate shaft 138 since the rear section 44 will rotate as a unit as was described earlier with respect to the fifth and sixth gear speeds. However, when the vehicle is stationary, the output shaft, the intermediate shaft, and the first planet carrier 70 become stationary and therefor the entire first planetary gear set is stationary. This mode of operation is desirable when auxiliary equipment is being operated for extended periods of time, for the largest portion of the transmission itself will not be rotating as is the case with many prior art transmissions. Although the rotating housings 46 and 176 of the front section 42 and 160 would remain rotating if the engines connected thereto are running, the respective front planetary gear sets 20 and 162 are not coupled thereto, and the engine can thus run the PTO shaft 182 for example without subjecting the transmission to unnecessary rotation at high relative speeds.

Thus, in view of the foregoing comments, it can be appreciated that the transmission 10 of FIG. 1 has a particularly advantageous front section 42 with a rotating housing 46 serving in the input and being normally engine driven, and with a pair of rotating disc-type clutch assemblies 30,32 for selectively connecting the ring gear and the planet carrier of a planetary gear set to the rotating housing, along with a continually held or stationary sun gear reaction member. This construction extends the service life of the components of the front section because the clutch assemblies are associated with the higher torque carrying members and the rotating housing favors the distribution of cooling and lubricating fluid through the clutch assemblies. The front section 160 of the second embodiment illustrated in FIG. 3 has advantages similar to the first embodiment, but shows more clearly how a PTO shaft 182 can be continually operated while allowing the first planetary gear set 162 to remain stationary when both of the clutch means 164 and 166 are disengaged. Still further, the heavier masses of the rotating housings 46 and 176 are connected to the input such that each shift between gears tends to be more alike and smoother. These improved dynamic conditions tend to simplify the construction of the associated control system.

Other aspects, objects and advantages will become apparent from a study of the specification, drawings and appended claims.

We claim:

1. A planetary transmission (10) comprising:
   a front section (42) having a rotating housing (46) and a planetary gear set (20) including a sun gear (68), a planet carrier (70) and a ring gear (66), the rotating housing (46) serving as the input and the planet carrier (70) serving as the output;
   holding means (88) for holding the sun gear (68) stationary;
   first clutch means (30) for selectively connecting the ring gear (66) to the rotating housing (46) and providing an underdrive mode of operation and including an actuating piston (110) jointly rotatable with the housing (46); and
   second clutch means (32) for selectively connecting the planet carrier (70) to the rotating housing (46) and providing a direct drive mode of operation and including an actuating piston (110) jointly rotatable with the housing (46).

2. The planetary transmission (10) of claim 1 including a stationary housing (28), and wherein the holding means (88) includes an elongate solid shaft (94) continuously connected to the stationary housing (28) and connected to the sun gear (68).

3. The planetary transmission (10) of claim 1 wherein the holding means (88) includes a front stationary member (90) and means (94) extending forwardly for connecting the sun gear (68) to the front stationary member (90) and continually keeping it from rotating.

4. The planetary transmission (10) of claim 1 including a central axis (12), a tubular input shaft (16) disposed on the axis (12) and connected to the rotating housing (46), and wherein the holding means (88) includes an elongate shaft (94) extending through the tubular shaft (16) and being connected to the sun gear (68).

5. The planetary transmission (10) of claim 1 wherein the first and second clutch means (30,32) each have balancing chamber means (116) defined between each piston (110) and the rotating housing (46) for holding fluid under pressure and biasing the pistons (110) toward disengagement.

6. The planetary transmission (10) of claim 1 wherein the actuating pistons (110) of the first and second clutch means (30,32) are hydraulically engaged and spring disengaged.

7. A planetary transmission (10) comprising:
 a front section (42) having a rotating housing (46) and a planetary gear set (20) including a sun gear (68), a planet carrier (70) and a ring gear (66);
 holding means (88) for holding the sun gear (68) continually stationary;
 first clutch means (30) for selectively connecting the ring gear (66) to the rotating housing (46) and including a hydraulically engaged and spring disengaged annular piston (110); and
 second clutch means (32) for selectively connecting the planet carrier (70) to the rotating housing (46) and including a hydraulically engaged and spring disengaged annular piston (110), the annular pistons (110) and rotating housing (46) being conjointly rotatable and serving as a relatively substantial driven input mass.

8. The planetary transmission (10) of claim 7 wherein the first and second clutch means (30,32) each have balancing chamber means (116) defined between each piston (110) and the rotating housing (46) for holding fluid under pressure and biasing the pistons (110) toward disengagement.

* * * * *